United States Patent
Nishimoto et al.

(10) Patent No.: US 9,481,422 B2
(45) Date of Patent: Nov. 1, 2016

(54) MOTORCYCLE

(71) Applicant: HONDA MOTOR CO., LTD., Tokyo (JP)

(72) Inventors: Taro Nishimoto, Wako (JP); Taishi Inoue, Wako (JP); Akiko Ishikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/024,646

(22) PCT Filed: Sep. 27, 2013

(86) PCT No.: PCT/JP2013/076320
§ 371 (c)(1),
(2) Date: Mar. 24, 2016

(87) PCT Pub. No.: WO2015/045111
PCT Pub. Date: Apr. 2, 2015

(65) Prior Publication Data
US 2016/0288852 A1  Oct. 6, 2016

(51) Int. Cl.
*B62J 15/02* (2006.01)
*B62J 6/04* (2006.01)

(52) U.S. Cl.
CPC ........ *B62J 15/02* (2013.01); *B62J 6/04* (2013.01); *B62K 2202/00* (2013.01)

(58) Field of Classification Search
CPC .................................. B62J 15/02; B62J 6/04
USPC ................ 280/152.1, 152.2, 152.3, 852
See application file for complete search history.

(56) References Cited

U.S. PATENT DOCUMENTS

| 3,963,158 | A | * | 6/1976 | Clenet | B62J 9/00 224/413 |
| 4,422,659 | A | * | 12/1983 | Nebu | B62B 9/16 180/219 |
| 6,889,789 | B2 | * | 5/2005 | Kurayoshi | B62K 19/30 180/219 |
| 7,114,836 | B2 | * | 10/2006 | Sheu | B62J 6/04 340/475 |
| 7,341,364 | B2 | * | 3/2008 | Yamaguchi | B60Q 1/0094 362/473 |
| 7,641,238 | B2 | * | 1/2010 | Fujimoto | B62J 15/00 280/851 |

(Continued)

FOREIGN PATENT DOCUMENTS

| JP | H03-64886 | 6/1991 |
| JP | 2010-083325 | 4/2010 |

(Continued)

OTHER PUBLICATIONS

International Preliminary Report on Patentability (Chapter II) and Written Opinion of the International Searching Authority with English Translation dated Dec. 17, 2013, 18 pages.

(Continued)

*Primary Examiner* — John Walters
*Assistant Examiner* — Jacob Meyer
(74) *Attorney, Agent, or Firm* — Rankin, Hill & Clark LLP

(57) ABSTRACT

A motorcycle including a rear fender (40) having a plurality of attachment parts (51, 53) provided on a rear surface (43). The attachment parts (51, 53) are provided in left-right pairs. When attaching a plate member to the rear fender (40), the plate member is fastened to the rear fender (40) by passing a fastening member through a portion of the attachment parts (51, 53).

6 Claims, 21 Drawing Sheets

(56) References Cited

U.S. PATENT DOCUMENTS

| | | | | |
|---|---|---|---|---|
| 7,766,355 B2* | 8/2010 | Ichihara | ............... | B62J 15/00 180/219 |
| 8,256,939 B2* | 9/2012 | Onoda | ............... | B62J 6/04 362/473 |
| 8,317,212 B2* | 11/2012 | Kobayashi | ............... | B62J 15/00 180/219 |
| 8,499,878 B2* | 8/2013 | Yamakura | ............... | B62J 6/005 180/219 |
| 8,602,615 B2* | 12/2013 | Nishijima | ............... | B60Q 1/56 362/473 |
| 9,174,690 B2* | 11/2015 | Suzuki | ............... | B60Q 1/56 |
| 2004/0079009 A1* | 4/2004 | Arrua | ............... | B60R 13/105 40/204 |
| 2007/0046016 A1* | 3/2007 | Fujimoto | ............... | B62J 15/00 280/847 |
| 2009/0008893 A1* | 1/2009 | Ishikawa | ............... | B62J 15/00 280/152.3 |
| 2016/0144904 A1* | 5/2016 | Nishimoto | ............... | B62J 17/00 280/281.1 |
| 2016/0214671 A1* | 7/2016 | Taguma | ............... | B62J 6/04 |

FOREIGN PATENT DOCUMENTS

| | | |
|---|---|---|
| JP | 2011-046302 | 3/2011 |
| JP | 2013-039840 | 2/2013 |

OTHER PUBLICATIONS

International Search Report, Date of mailing: Dec. 17, 2013.

* cited by examiner

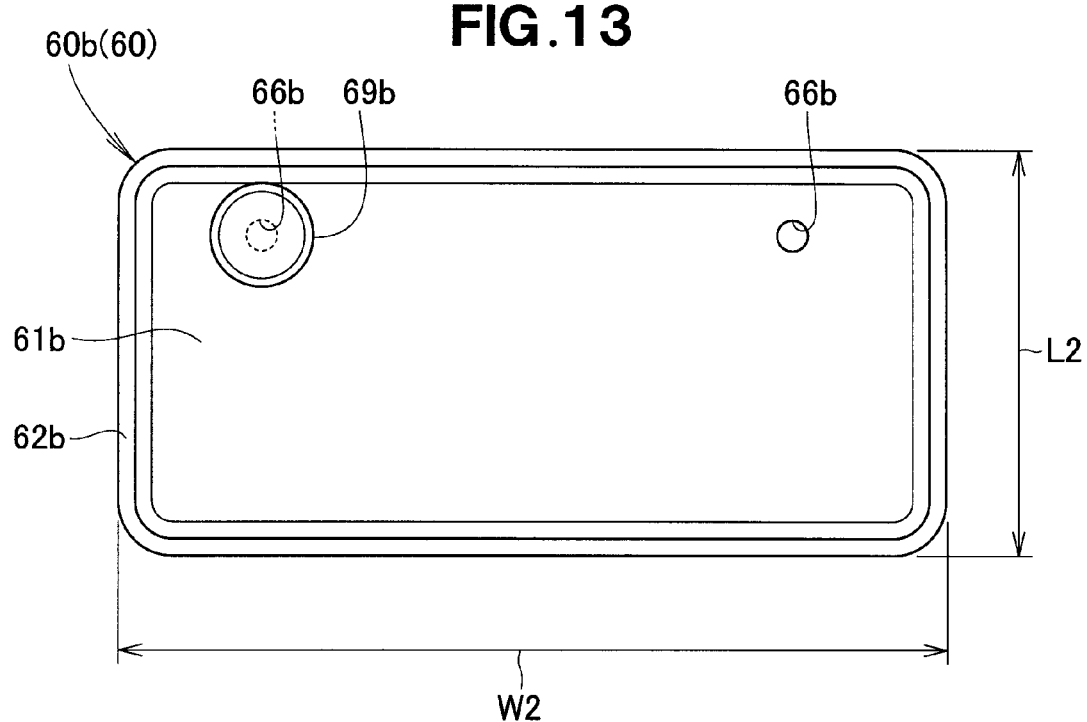
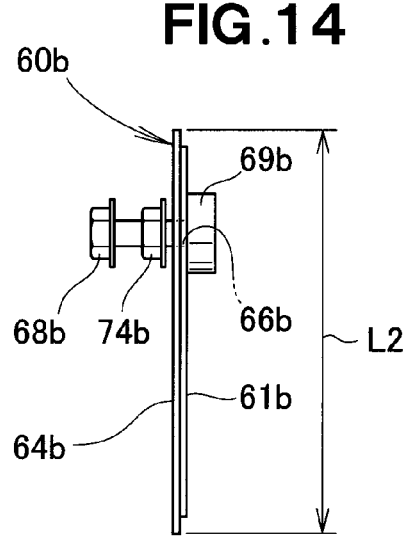

MOTORCYCLE

TECHNICAL FIELD

The present invention relates to a motorcycle, and in particular, to a structure for mounting a plate member indicating information identifying the motorcycle.

BACKGROUND ART

License plates attached to motorcycles indicate information identifying the motorcycles. The plural kinds of the license plates have different shapes or mounted positions in different countries. A structure designed to mount these kinds of the license plates is disclosed in patent literature 1 below.

For the motorcycle disclosed in patent literature 1, the rear fender has a rear surface including license plate mounting portions, which define plural pairs of mounting holes. A license plate is attached using selected ones of the mounting holes suitable for the kind of the license plate.

The license plate mounting portions, which define the plural mounting holes to support left and right sides of the license plate, have complex structures protruding in left and right directions. To prevent vibrating of the license plate, the license plate mounting portions are desired to reduce vibration transmitted thereto. To meet such needs, the license plate mounting portions, which have the complex structures and define the plurality of mounting holes, need to be thicker enough to reduce the vibration.

A desirable rear fender is simply configured to reduce the vibration, as well as to allow for mounting different kinds of license plates for the different countries.

PRIOR ART LITERATURE

Patent Literature:

Patent Literature 1: JP-A-2011-46302

SUMMARY OF INVENTION

Technical Problem

It is an object of the present invention to provide a simple configuration that reduces vibrations as well as allowing for mounting the different kinds of the license plates for different countries.

Solution to Problem

According to the invention defined in claim 1, there is provided a motorcycle comprising: a rear fender disposed on a rear part of a motorcycle frame of the motorcycle for preventing splash of muddy water as the muddy water is forced upwardly by a rear wheel of the motorcycle; fasteners disposed on rear surfaces of the rear fender and fastened to the rear fender; a lamp disposed above the rear fender for illuminating the rear surfaces; and a reflector disposed adjacent the rear surfaces for reflecting light from a rear direction of the motorcycle, wherein the rear fender includes a plurality of mounting portions, wherein the fasteners pass through any ones of the mounting portions and are fastened to the rear fender, wherein the rear surfaces comprise at least one left rear surface and at least one right rear surface when the rear surfaces are viewed in rear elevation, and wherein the rear fender includes a central portion recessed forward relative to the rear surfaces.

According to the invention defined in claim 2, the rear surfaces include opposite lateral outer ends spaced apart in a widthwise direction of the motorcycle, wherein the rear fender further includes: lateral surfaces protruding from the opposite lateral outer ends of the rear surfaces in a forward direction of the motorcycle; and depressions recessed from the rear surfaces to the lateral surfaces, and wherein each of the rear surfaces has a laterally opened U-shape.

According to the invention defined in claim 3, each of the depressions is provided between adjacent ones of the plurality of mounting portions when the depressions are viewed in rear elevation, the adjacent mounting portions being arranged vertically.

According to the invention defined in claim 4, each of the mounting portions has an oblong shape elongated in the widthwise direction of the motorcycle.

According to the invention defined in claim 5, the rear fender further includes a rearward protruding portion provided below the mounting portions of the rear fender.

According to the invention defined in claim 6, the mounting portions are provided in pairs, the number of the pairs being at least two.

According to the invention defined in claim 7, the rear fender further includes a lower mounting portion provided below the protruding portion, and the lower mounting portion selectively has a mounting hole formed therethrough.

Advantageous Effects of Invention

As to the invention defined in claim 1, the rear fender includes the plurality of mounting portions. The fasteners, which pass through any ones of the mounting portions, are fastened to the rear fender. The mounting portions corresponding to a kind of a member to be attached to the rear fender have openings therethrough while the other mounting portions have no through-holes. The rear fender, which has the minimum number of mounting holes necessary for the attachment of the member, is highly rigid. Such a simple configuration of the rear fender reduces vibration, in addition to allowing attachment of different kinds of members for different countries.

The rear surfaces comprise the at least one left rear surface and the at least one right rear surface when the rear surfaces are viewed in rear elevation, and the rear fender includes the central portion recessed forward relative to the rear surfaces. The central recessed portion enhances rigidity of the rear fender, thus reducing the vibration.

As to the invention defined in claim 2, the rear surfaces include the opposite lateral outer ends spaced apart in the widthwise direction of the motorcycle, wherein the rear fender further includes: the lateral surfaces protruding from the opposite lateral outer ends of the rear surfaces in the forward direction of the motorcycle; and the depressions recessed from the rear surfaces to the lateral surfaces, and wherein each of the rear surfaces has the laterally opened U-shape. The depressions of the rear fender, which can receive projections on a back surface of a member, allows appropriate abutment of the member on the rear surfaces of the rear fender in attaching the member to the rear surfaces.

As to the invention defined in claim 3, each of the depressions is provided between the adjacent ones of the plurality of mounting portions when the depressions are viewed in rear elevation, the adjacent mounting portions being arranged vertically. When a member having projections on a back surface thereof is attached to the rear fender, the projections are positioned in place by insertion into the depressions. This facilitates the attachment of the member to the rear fender.

As to the invention defined in claim 4, each of the mounting portions has the oblong shape elongated in the widthwise direction of the motorcycle. The oblong mounting portion can have an opening formed therethrough over a wide range elongated in the widthwise direction. This allows positional adjustment of a member in the widthwise direction, thus facilitating attachment of the member. Additionally, the mounting portion allows different members to be attached to different positions in the widthwise direction.

As to the invention defined in claim 5, the rear fender further includes the rearward protruding portion provided below the mounting portions. The protruding portion can abut on and thus flex a member. This reduces vibration transmitted to the member.

As to the invention defined in claim 6, the mounting portions are provided in pairs, the number of the pairs being at least two. The selected mounting portions corresponding to a kind of a member have openings therethrough. Such mounting portions thus correspond to different kinds of members.

As to the invention defined in claim 7, the rear fender further includes the lower mounting portion provided below the protruding portion, and the lower mounting portion selectively has the mounting hole formed therethrough. A member can be attached to the lower mounting portion through a stay, which appropriately adjusts an angle of the member. The appropriately adjusted angle of the member allows the lamp to appropriately illuminate the member.

BRIEF DESCRIPTION OF DRAWINGS

FIG. 13 is a front elevation view of a member used in Embodiment 2;

FIG. 14 is a side elevation view of the member shown in FIG. 13;

DESCRIPTION OF EMBODIMENTS

The preferred embodiments will now be discussed with reference to the accompanying drawings.

Embodiment 1

Figure 1:
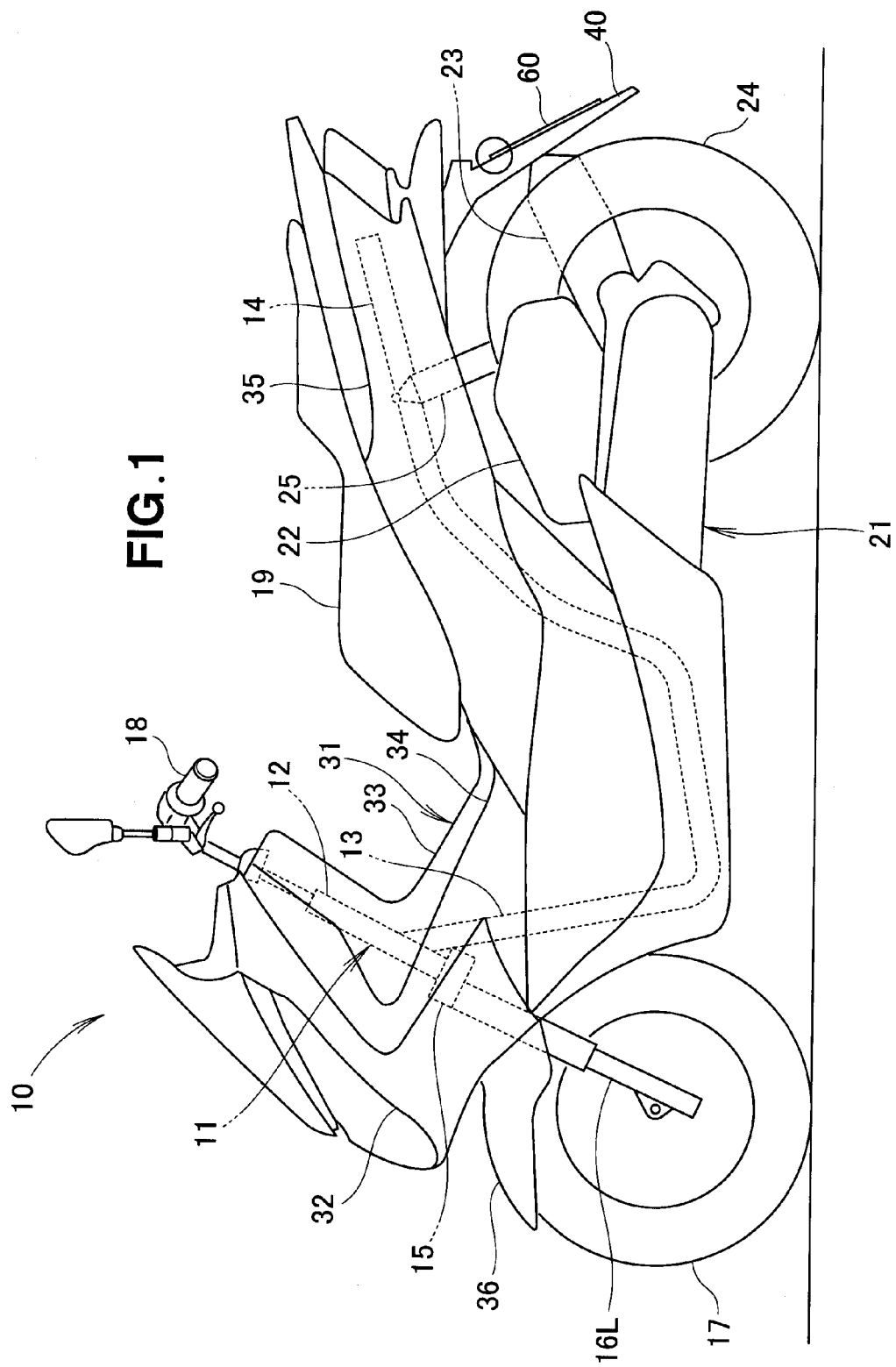
FIG. 1 is a left side elevation view of a motorcycle using a member mounting structure according to Embodiment 1 of the present invention.

As shown in FIG. 1, a motorcycle 10 includes a motorcycle frame 11, a power unit 21 pivotably suspended on a rear part of the frame 11, and a motorcycle cover 31 covering the frame 11.

The frame 11 includes a head pipe 12, a main frame 13 extending rearward and downward from the head pipe 12, and seat rails 14 extending rearward and upward from a rear end of the main frame 13.

The head pipe 12 has a bottom supporting a front fork 16L through a bottom bridge 15. The reference characters "L" and "R" as used herein are suffixes indicating the left and the right, respectively. A front wheel 17 is rotatably supported by the front fork 16L. A handle 18 for steering the front wheel 17 is disposed on a top of the head pipe 12. A rider's seat 19 is disposed above the seat rails 14.

The power unit 21 includes an intake cleaner 22, an exhaust muffler 23, and a rear wheel 24 as a drive wheel. Left and right rear cushions 25 are disposed between the power unit 21 and the pair of the seat rails 14 for absorbing impact.

The motorcycle cover 31 includes a front cover 32 covering a front side of the head pipe 12, a main frame cover 33 covering an upper side of the main frame 13, a side cover 34 covering opposite lateral sides of the main frame 13, and a rear cover 35 covering the set rails 14. A front fender 36 covers an upper side of the front wheel 17, and a rear fender 40 covers an upper side of the rear wheel 24.

A plate member 60 indicating information identifying the motorcycle (hereinafter referred to as "vehicle 20") is disposed on the fear fender 40.

Figure 2:
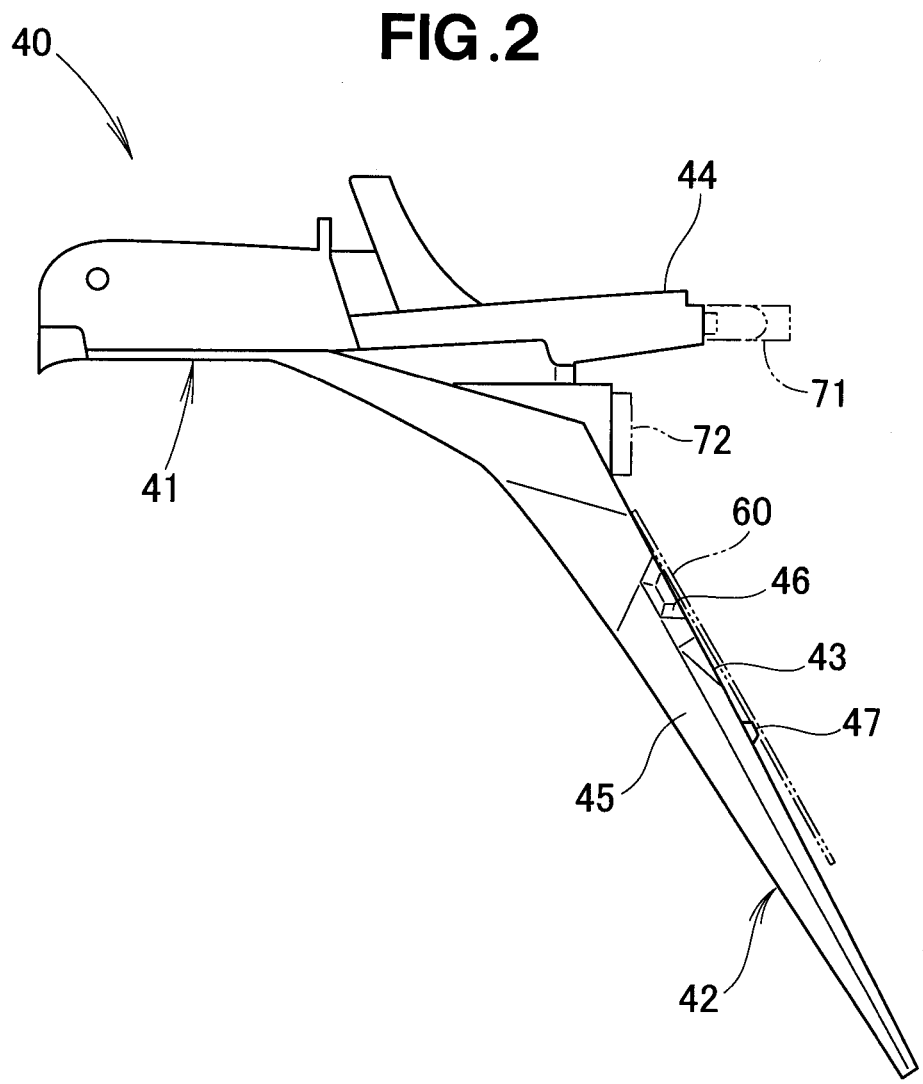
FIG. 2 is a left side elevation view of a rear fender shown in FIG. 1.
Figure 3:
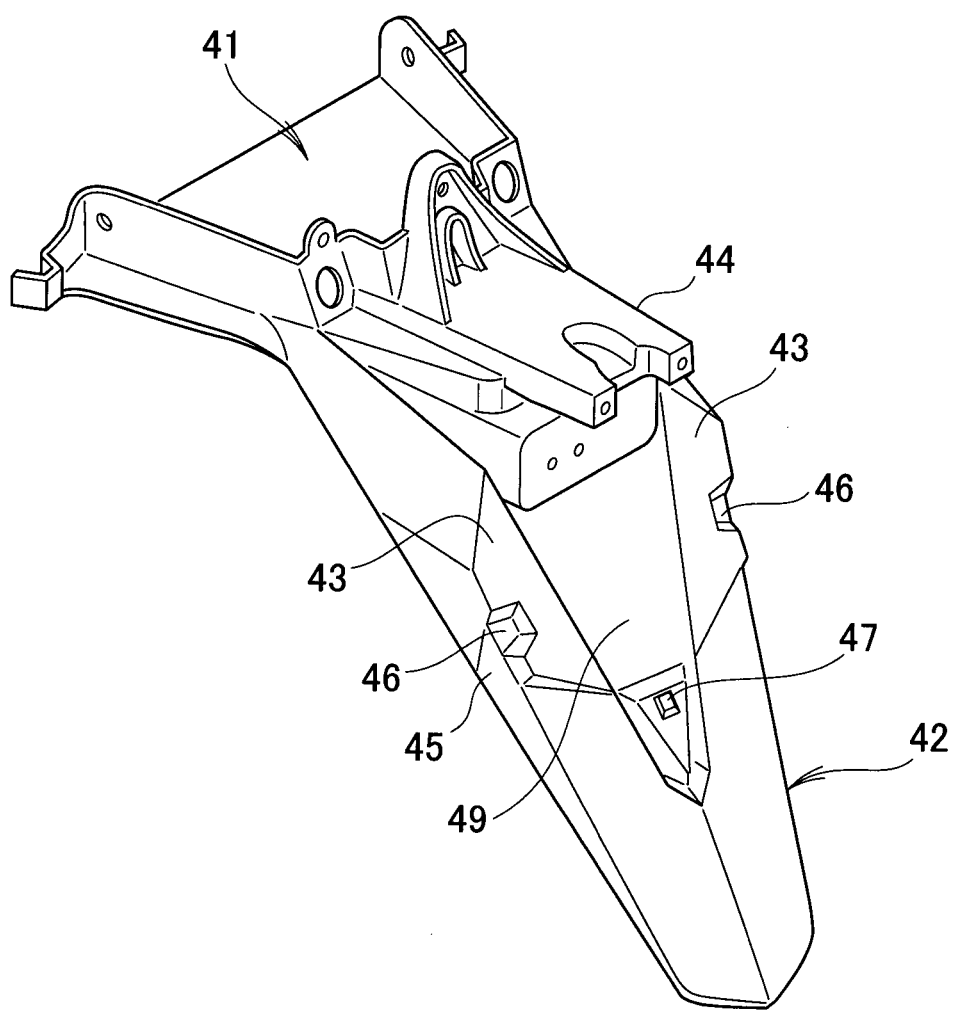
FIG. 3 is a perspective view of the rear fender shown in FIG. 1.

The rear fender will be discussed. As shown in FIGS. 2 and 3, the rear fender 40 includes a horizontal portion 41 extending generally horizontally, and a rear hung portion 42 extending from a lower part of the horizontal portion 41 in a downward and rearward direction. The plate member 60 is attached to rear surfaces 43 of the rear hung portion 42.

The horizontal portion 44 has a horizontal extension 44 extending in a rearward direction of the vehicle. The horizontal extension 44 is positioned at an upper part of the rear fender 40. The rear fender 40 has a lamp 71 disposed on a rear end of the horizontal extension 44 for illuminating the plate member 60. The rear fender 40 further has a reflector 72 disposed adjacent the plate member 60 for reflecting light from the rearward direction.

The rear fender 40 includes the left and right planar rear surfaces 43, 43 separated from each other, and lateral surfaces 45 projecting from the corresponding lateral outer ends of the rear surfaces 43 in a forward direction of the vehicle. It is to be noted that the lateral outer ends of the individual rear surfaces 43 are spaced from each other in a widthwise direction of the vehicle. The lateral surface 45 is angled relative to the rear surface 43. A depression 46 is formed adjacent a lateral outer edge of the rear surface 43. The depression 46 is recessed from the rear surface 43 to the lateral surface 45. The plate member 60 is attached to the left and right rear surfaces 43, 43. The depression, or recessed portion 46, which is formed at an end portion of the rear fender 40, facilitates the attachment of the plate member having projections on the back surface thereof. This enhances the workability.

Although the recessed portion 46 is provided at an outer end of each of the left and right rear surfaces 43, the recessed portion 46 may be provided on any portion of each rear surface 43, and further be plural in number.

The rear hung portion 42 has a rearward protruding portion 47 provided at a vertical middle thereof. The plate member 60 may be large-sized enough to abut on the protruding portion 47.

Provided between the left and right rear surfaces 43, 43 of the rear fender 40 is a central portion 49 recessed forwardly relative to the rear surfaces 43, 43. The rear fender 40, which has the recessed central portion 49, has an increased rigidity sufficient to reduce vibration of the rear fender 40.

Figure 4:
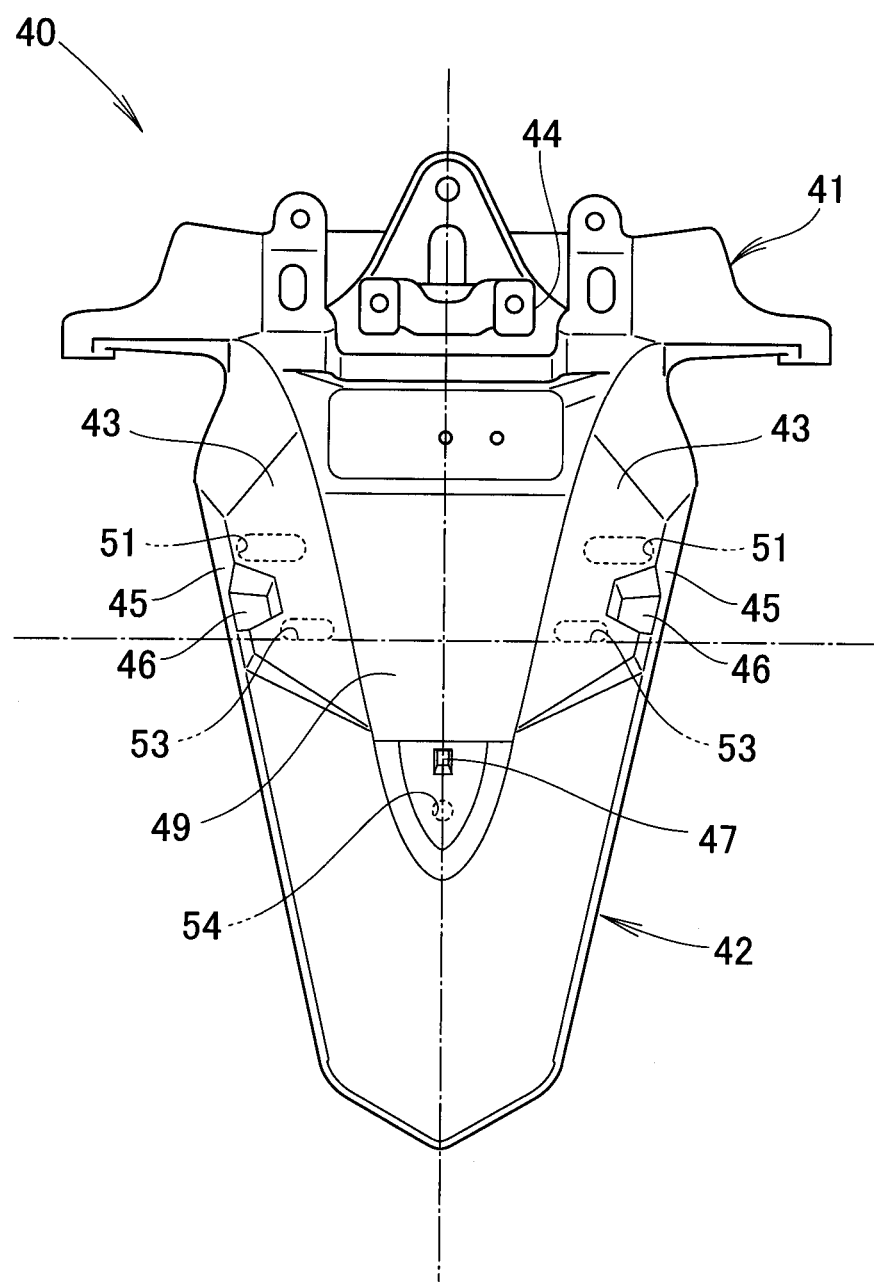
FIG. 4 is a rear elevation view of the rear fender shown in FIG. 1.

As shown in FIG. 4, the rear fender 40 includes a plurality of mounting portions 51, 53 on the rear surfaces 43. Each of the mounting portions 51, 53, which is in the shape of an oblong hole elongated in the widthwise direction of the vehicle, is provided in a pair so that the left and right mounting portions 51 are arranged while the left and right mounting portions 53 are arranged. The plate member 60 (FIG. 2) is fastened to the rear fender 40 by a fastener passing through any ones of the mounting portions 51, 53. Provided below the protruding portion 47 is a lower mounting portion 54, which selectively has a mounting hole formed therethrough. The plate member 60 can be attached to the lower mounting portion 54 through a stay, which appropriately adjusts an angle of the plate member 60.

The one pair of the mounting portions 51 or 53 corresponding to the kind of the plate member 60 has holes formed therethrough for attachment of the plate member to the rear fender while the other pair of the mounting portions has no holes. The rear fender 40, which has the minimum number of the required mounting holes, is highly rigid. Such a simple configuration of the rear fender 40 reduces vibration transmitted to the rear fender 40.

The recessed portion 46, which is provided near the plurality of the mounting portions 51, 53, achieves an increased rigidity of the surroundings of the mounting locations of the rear fender 40 to which the plate member 60 is attached. This reduces vibration transmitted to the plate member 60.

Figure 5:
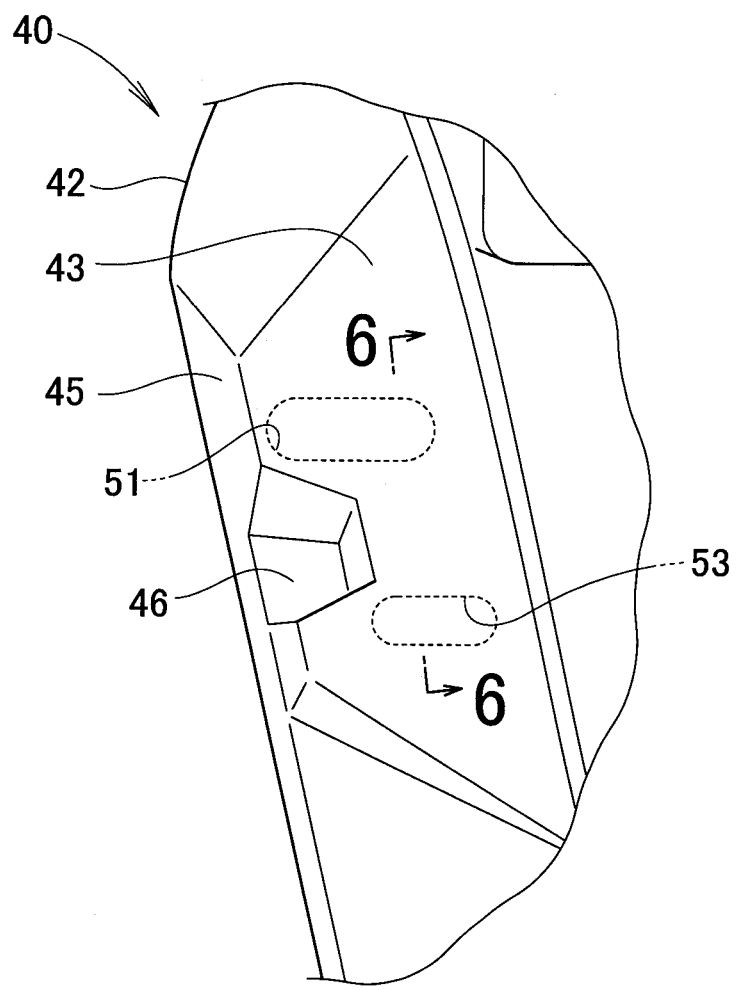
FIG. 5 is an enlarged view of main components of the rear fender shown in FIG. 4.

The mounting portions will now be described. As shown in FIG. 5, the mounting portions 51, 53 on the rear surface 43 of the rear fender 40 are positioned in correspondence to different attachment portions of different kinds of plate members. The first mounting portion 51, which is oblong, or elongated in the widthwise direction when viewed in rear elevation, is positioned proximate the lateral outer edge of the rear surface 43. The second mounting portion 53, which is oblong, or elongated in the widthwise direction when viewed in rear elevation, is positioned below the first mounting portion 51. The mounting portions 51, 53 are oblong in the above embodiment. Alternatively, the mounting portions may have other appropriate shapes such as circular shapes in correspondence to the kind of the plate member.

Figure 6:
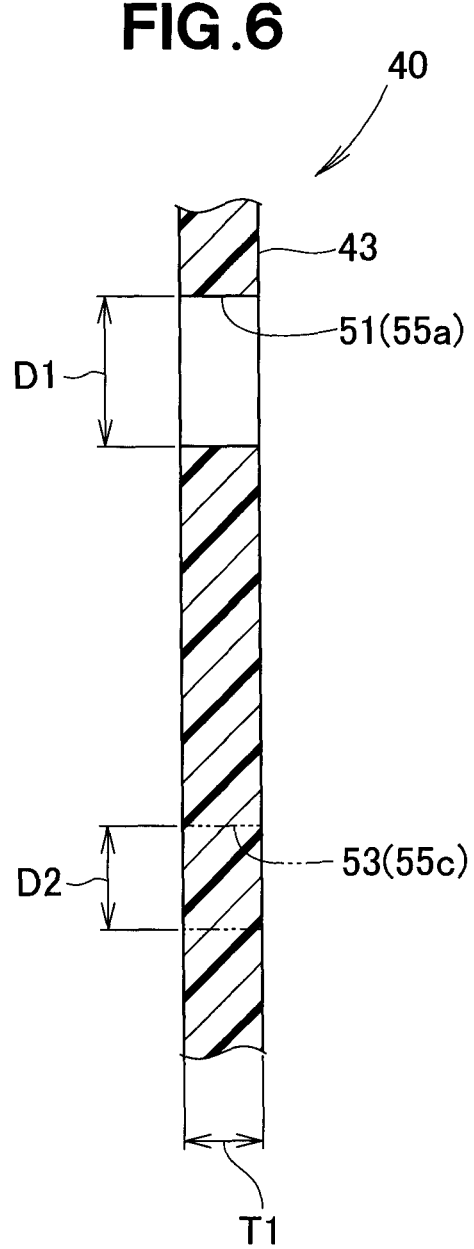
FIG. 6 is a cross-sectional view taken along line 6-6 of FIG. 5.

As shown in FIG. 6, the first mounting portion 51 has a diameter D1. The second mounting portion 53 has a diameter D2. The diameter D2 is smaller than the diameter D1 (D2>D1). The rear fender 40 has a thickness T1. The mounting portions 51, 53 have thicknesses T2. In the above embodiment, the diameter D2 is smaller than the diameter D1 (D2<D1). Alternatively, the diameters D1, D2 may be appropriately set in correspondence to the kind of the plate member 60, so that, for example, the diameter D1 is smaller than the diameter D2 (D1<D2). In the embodiment, the mounting portions 51, 53 have the same thickness. Alternatively, the mounting portions 51, 53 may have their thicknesses appropriately set in correspondence to the shapes or sizes of the mounting portions 51, 53.

The rear fender 40 is formed by injection molding. The mounting portions 51, 53 have mounting holes 55a, 55c partially formed therethrough. The mounting holes 55a, 55c are made using different cores placed in a mold during the injection molding.

Figure 7:
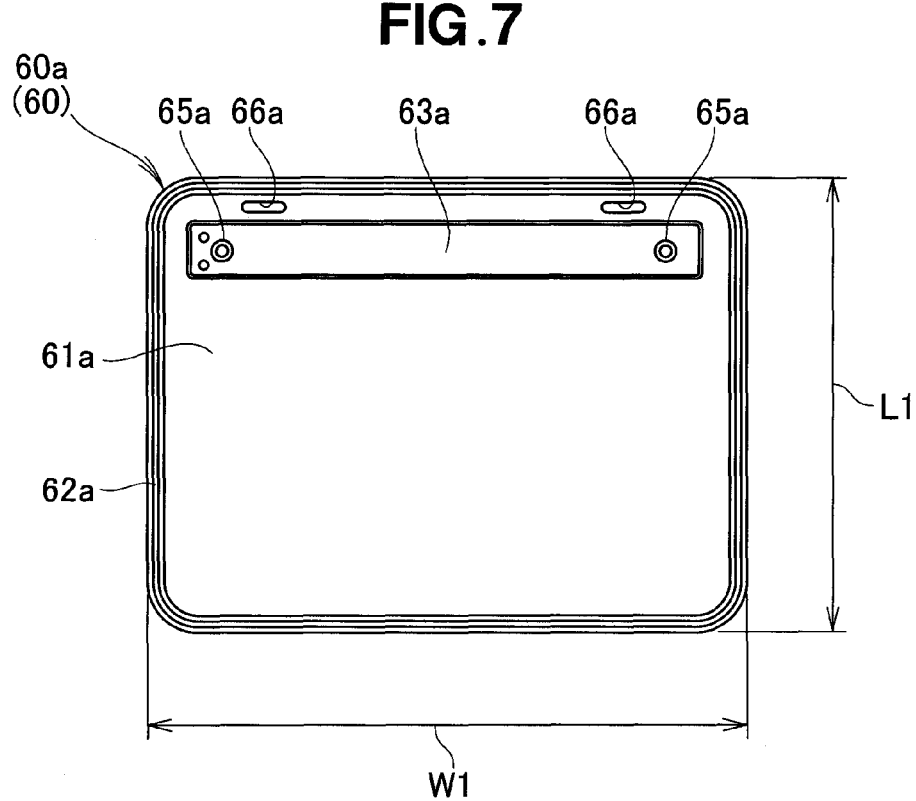
FIG. 7 is a front elevation view of a member used in Embodiment 1.
Figure 8:
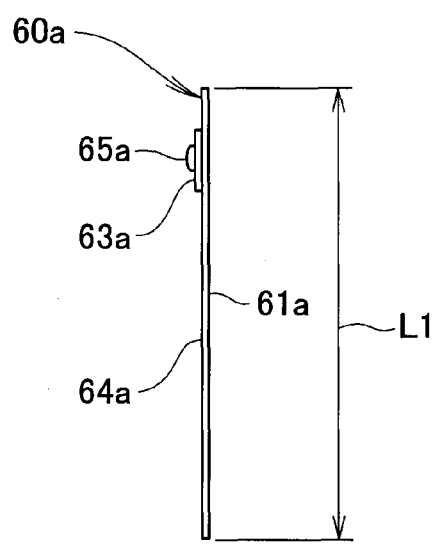
FIG. 8 is a side elevation view of the member shown in FIG. 7.

The attachment of the plate member will be described in detail. As shown in FIGS. 7 and 8, the plate member is a license plate 60a indicating information identifying the vehicle.

The license plate 60a includes a rectangular, flat plate portion 61a indicating a line of letters, and an edge portion 62a reinforcing a circumference of the flat plate portion 61a. The plate 60a also includes a depression 63a elongated in the widthwise direction and formed on an upper part of the flat plate portion 61a. The plate 60a further includes rivets 65a disposed on left and right ends of the depression 63a and protruding out of a back surface 64a. The plate 60a further includes through-holes 66a formed above left and right portions of the depression 63a and elongated in the widthwise direction. The license plate 60a has its length L1 and width W1.

Figure 9:
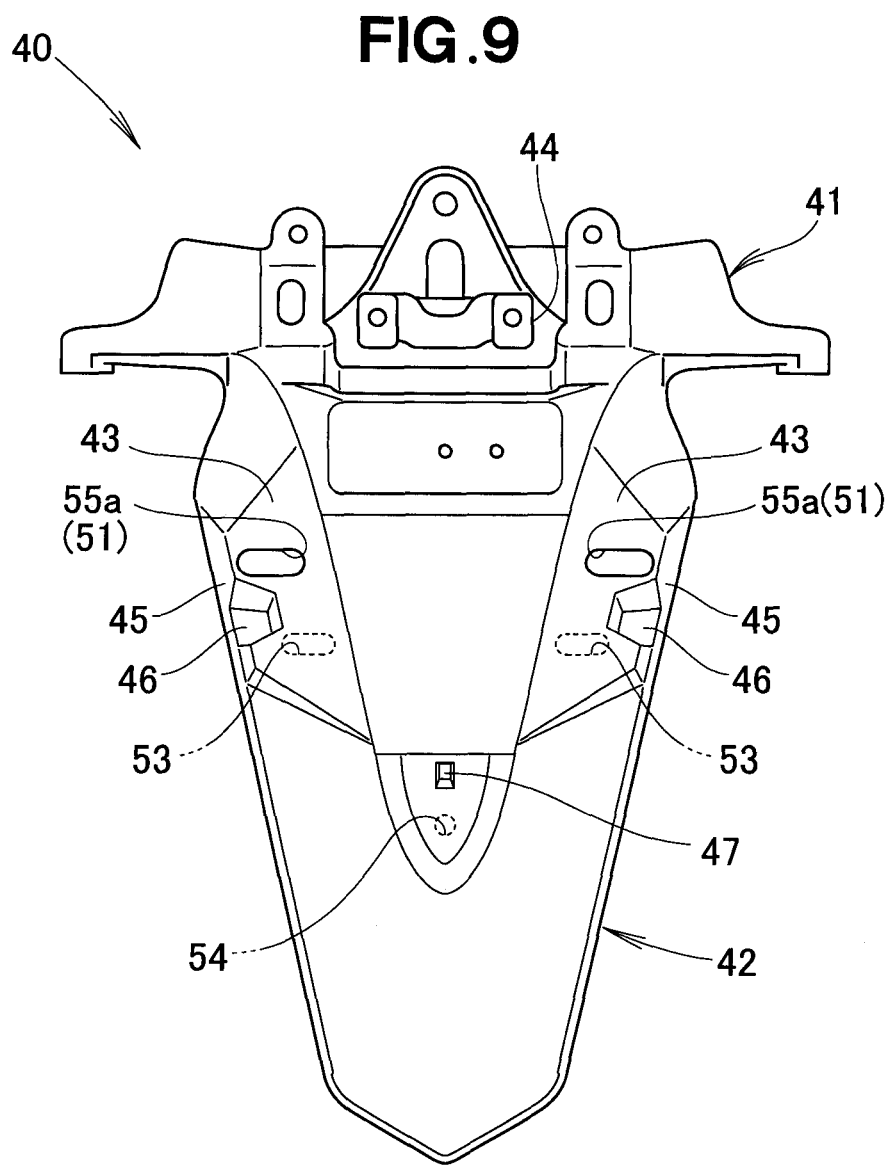
FIG. 9 is a rear elevation view of the rear fender according to Embodiment 1.
Figure 10:
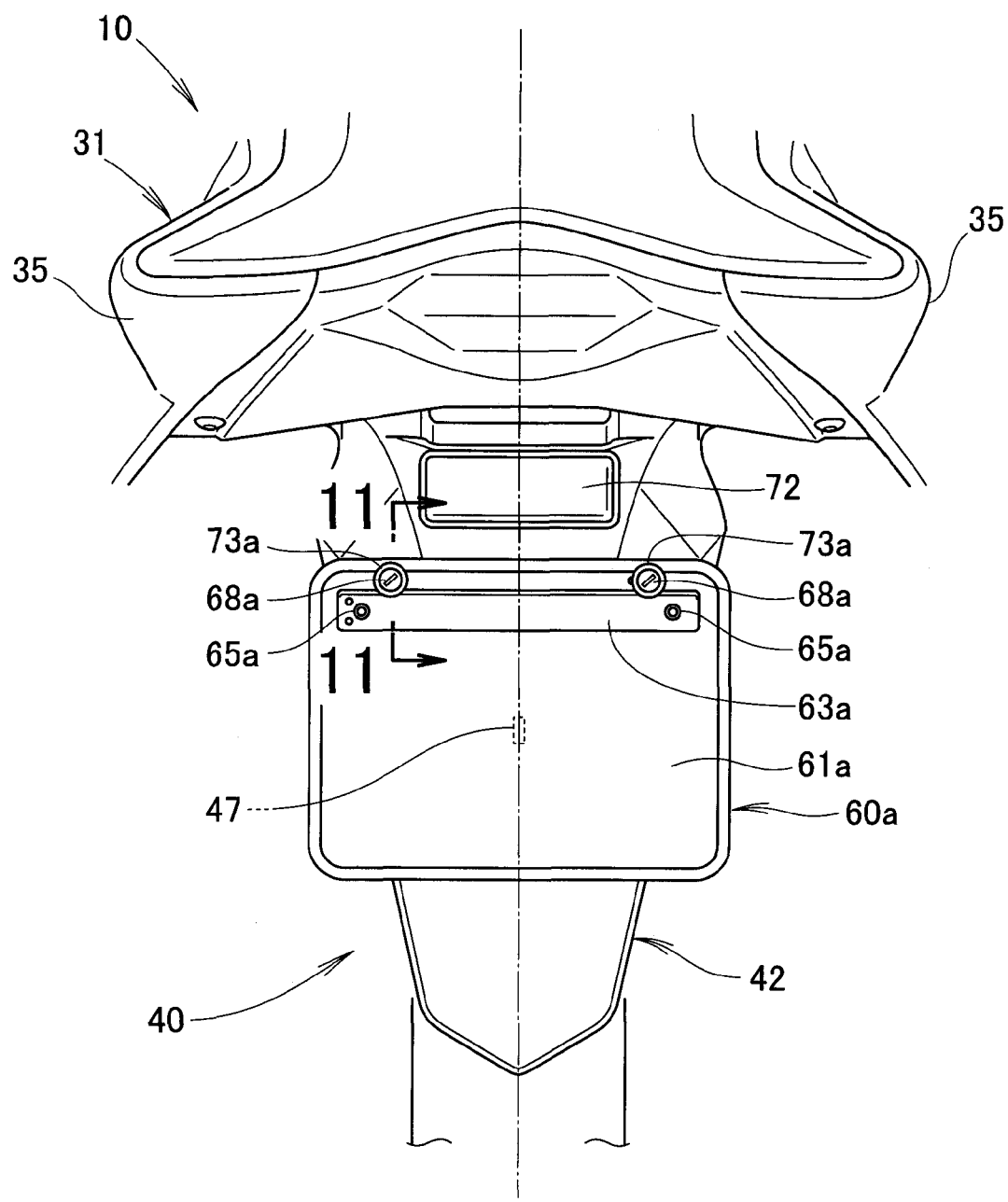
FIG. 10 is a rear elevation view of the motorcycle according to Embodiment 1.

As shown in FIG. 9, the mounting hole 55a is formed on the rear surface 43 of the rear fender 40. The mounting portion 53 remains solid without defining any through-holes. This achieves an increased rigidity of the rear fender 40.

Figure 11:
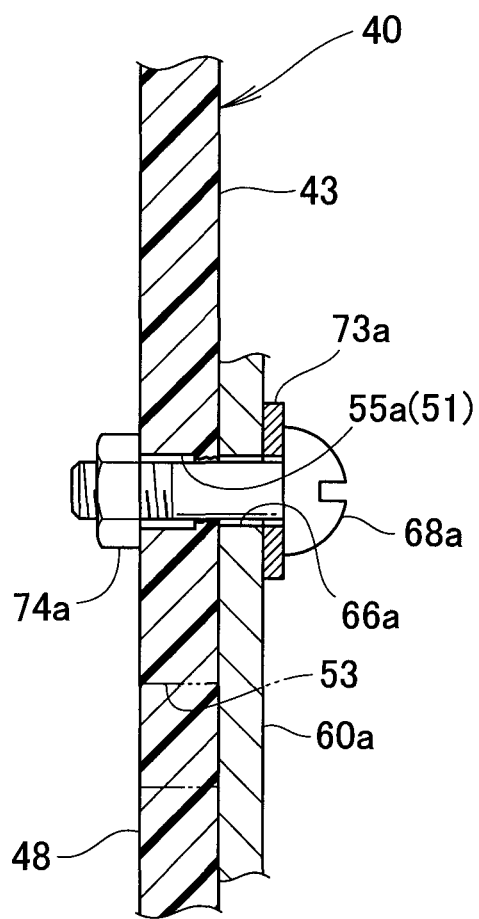
FIG. 11 is a cross-sectional view taken long line 11-11 of FIG. 10.
Figure 12:
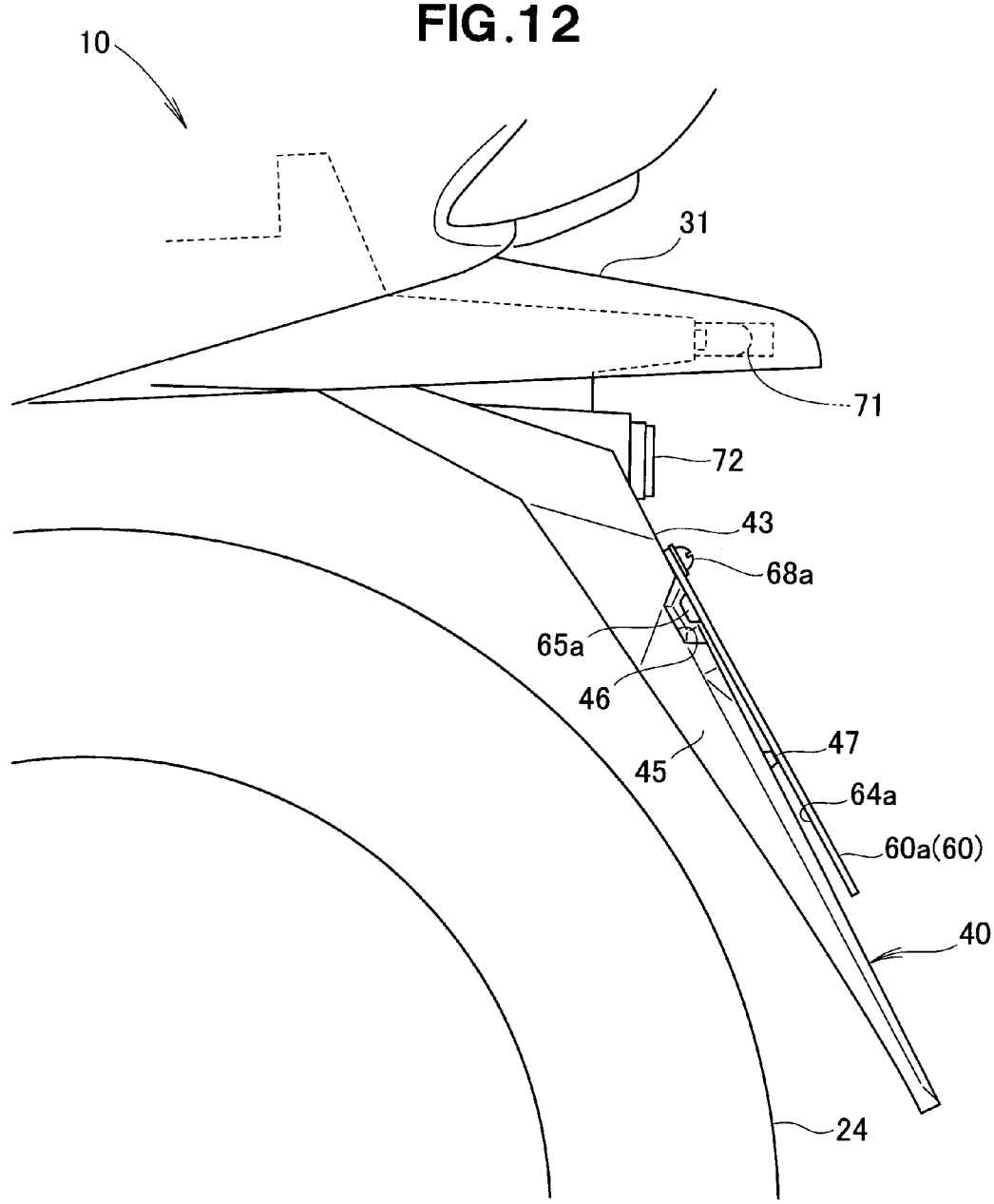
FIG. 12 is a left elevation view of the motorcycle shown in FIG. 10.

As shown in FIGS. 11 and 12, the license plate 60a is fastened to the rear fender 40 by fasteners 68a. The fastener 68a, which passes through a washer 73a, the through-hole 66a of the license plate 60a and the mounting hole 55a of the rear fender 40, is tightened to a nut 74a on a back surface 48 of the rear fender 40.

As shown in FIG. 12, the rivet 65a protruding out of the back surface 64a of the license plate 60a is received within the recessed portion 46 of the rear fender 40. The recessed portion 46, which receives the projection or rivet 65a on the back surface 64a of the license plate 60a, allows the license plate 60a to be appropriately attached to the rear fender 40. Such a structure of the rear fender 40 allows for attachment of different types of license plates thereto. The license plate 60a has a lower portion abutting on the protruding portion 47 of the rear fender 40.

Embodiment 2

A motorcycle according to Embodiment 2 will be described. The same reference numeral is used to denote the common element of the motorcycles in Embodiments 1 and 2.

As shown in FIG. 13, the plate member is a license plate 60b indicating information identifying the vehicle. The license plate 60b includes a rectangular, flat plate portion 61b indicating a line of letters, and an edge portion 62b reinforcing a circumference of the flat plate portion 61b. The plate 60b further includes through-holes 66b formed above left and right portions of the flat plate portion 61b. The license plate 60b has its length L2 and width W2.

As shown in FIG. 14, a fastener 68b, which passes from a back surface 64b of the license plate 60b through a nut 74b and the through-hole 66b, is secured to a pin covered with a cap 69b disposed on a front surface of the license plate 60b.

Figure 15:
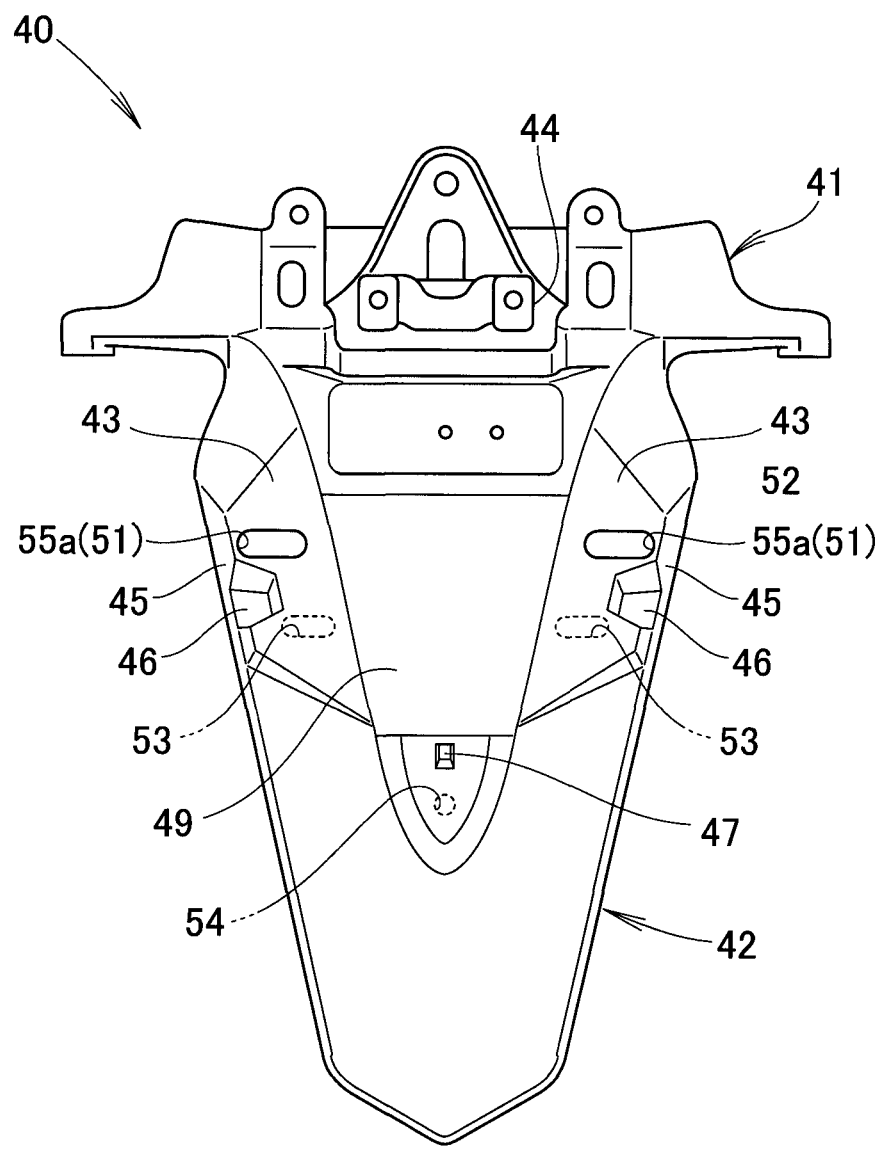
FIG. 15 is a rear elevation view of a rear fender according to Embodiment 2.

As shown in FIG. 15, the first mounting portion 51 (FIG. 9) of the rear fender 40 has the mounting hole 55a formed therethrough using a core during injection molding. The rear surface 43 of the rear fender 40 defines openings all of which are the mounting holes 55a. The mounting portions 53 remain solid without defining any through-holes. This achieves an increased rigidity of the rear fender 40.

Figure 16:
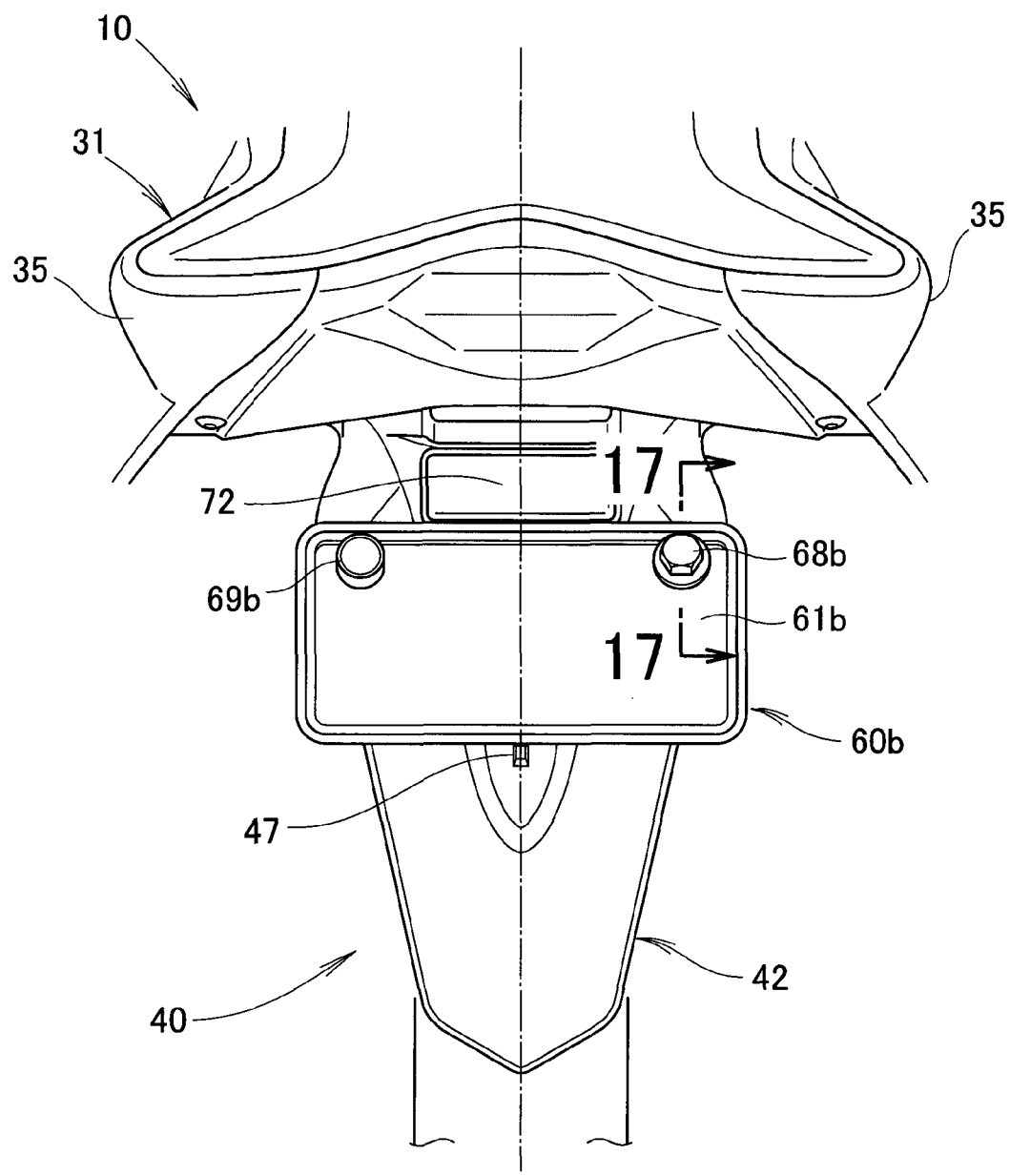
FIG. 16 is a rear elevation view of a motorcycle according to Embodiment 2.
Figure 17:
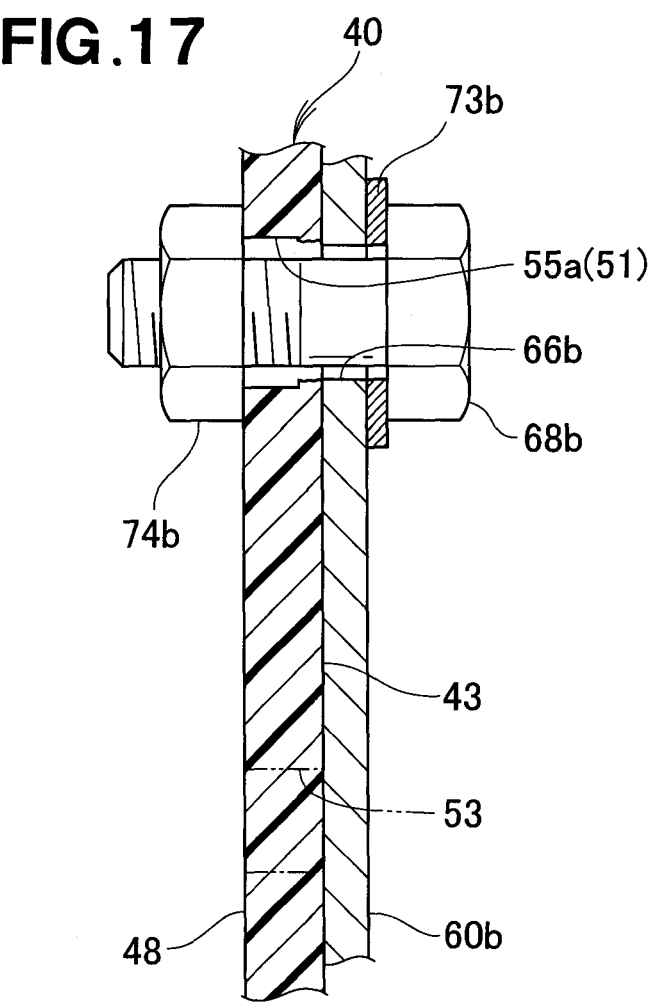
FIG. 17 is a cross-sectional view taken along line 17-17 of FIG. 16.

As shown in FIGS. 16 and 17, the license plate 60b is fastened to the rear fender 40 by the fastener 68b. The fastener 68b, which passes through a washer 73b, the through-hole 66b of the license plate 60b and the mounting hole 55a of the rear fender 40, is tightened to a nut 74b on the back surface 48 of the rear fender 40.

Figure 18:
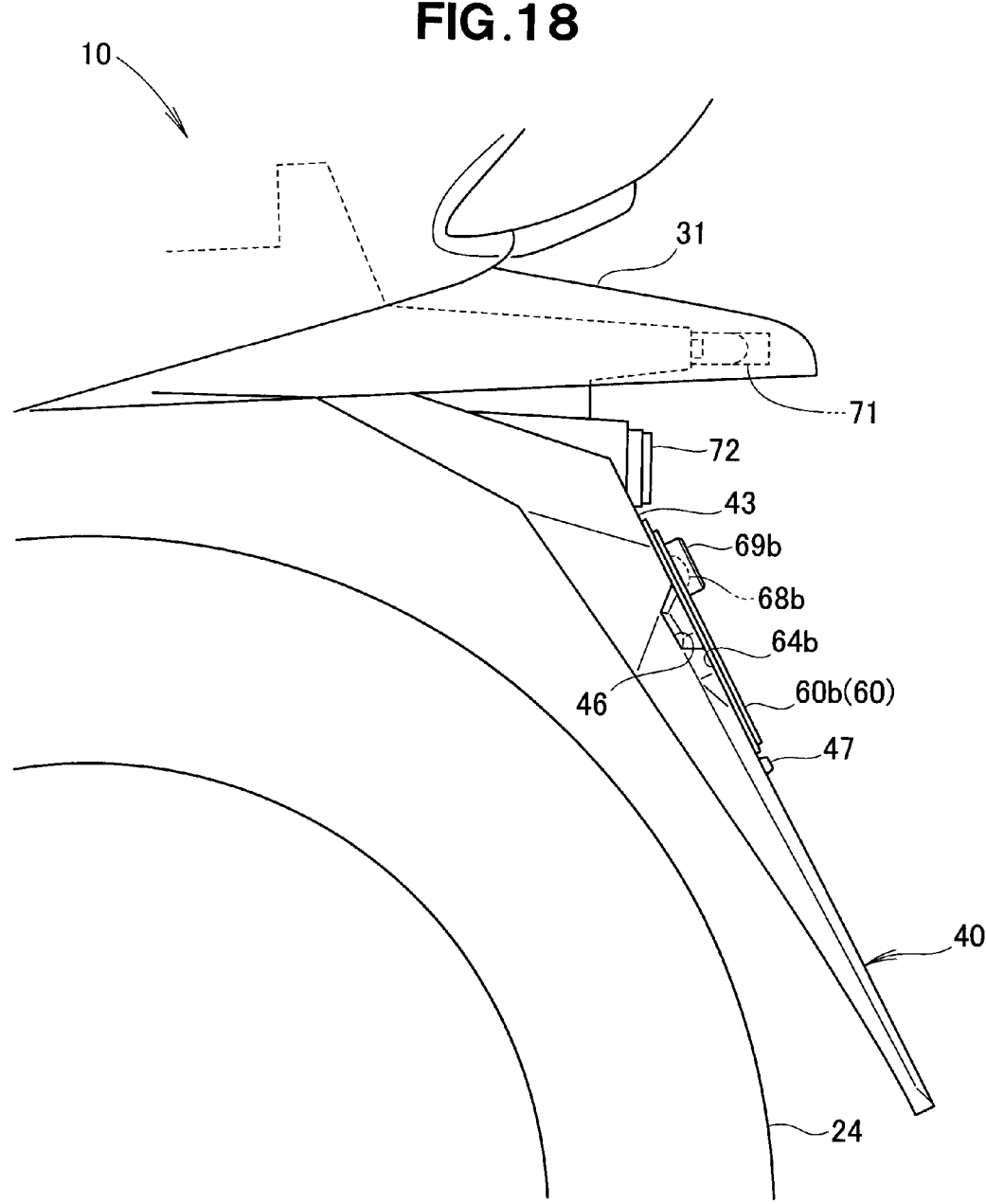
FIG. 18 is a left elevation view of the motorcycle shown in FIG. 16.

As shown in FIG. 18, the back surface 64b of the license plate 60b is set on the rear surface 43 of the rear fender 40. The license plate 60b, which covers and thus hides the recessed portion 46, achieves an improved outer visual appearance of the rear fender 40.

Embodiment 3

A motorcycle according to Embodiment 3 will be described. The same reference numeral is used to denote the common element of the motorcycles in Embodiments 1 and 3.

Figure 19:
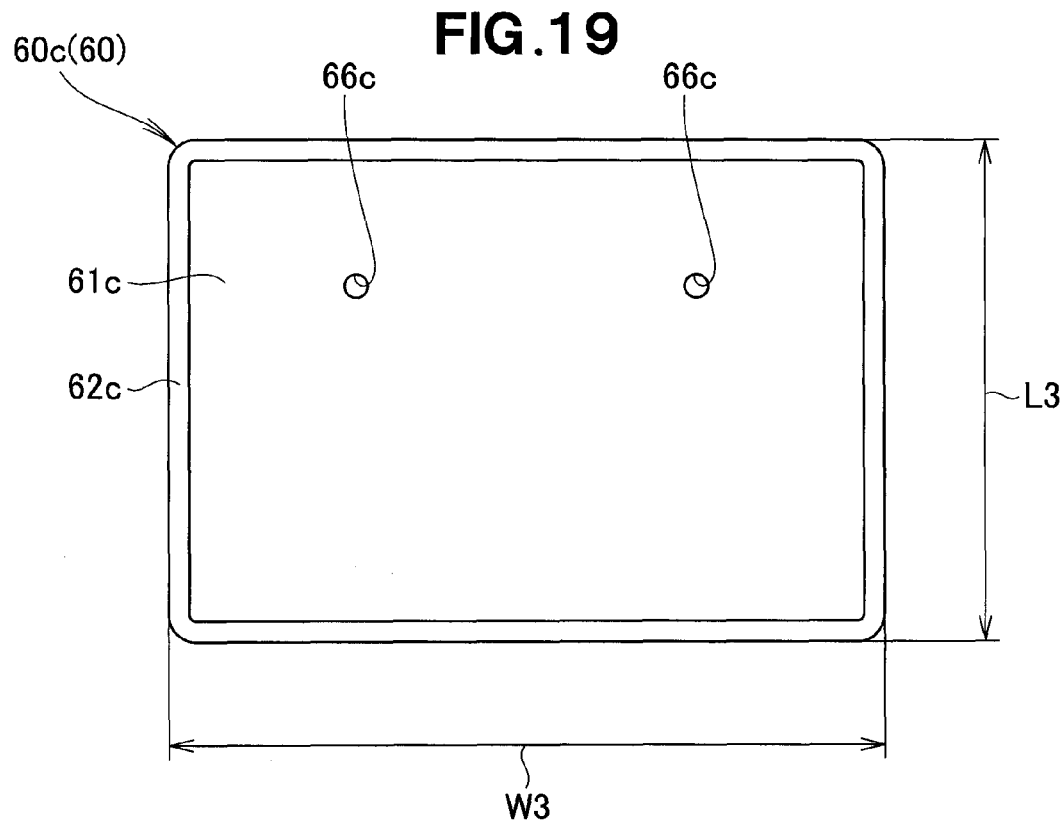
FIG. 19 is a front elevation view of a member used in Embodiment 3.
Figure 20:
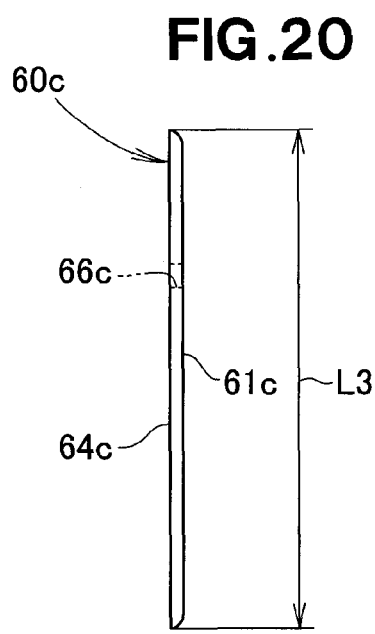
FIG. 20 is a side elevation view of the member shown in FIG. 19.

As shown in FIGS. 19 and 20, the plate member is a license plate 60c indicating information identifying the vehicle. The license plate 60c includes a rectangular, flat plate portion 61c indicating a line of letters, and an edge portion 62c reinforcing a circumference of the flat plate portion 61c. The plate 60c further includes through-holes 66c formed above left and right portions of the flat plate portion 61c. The license plate 60c has its length L3 and width W3.

Figure 21:
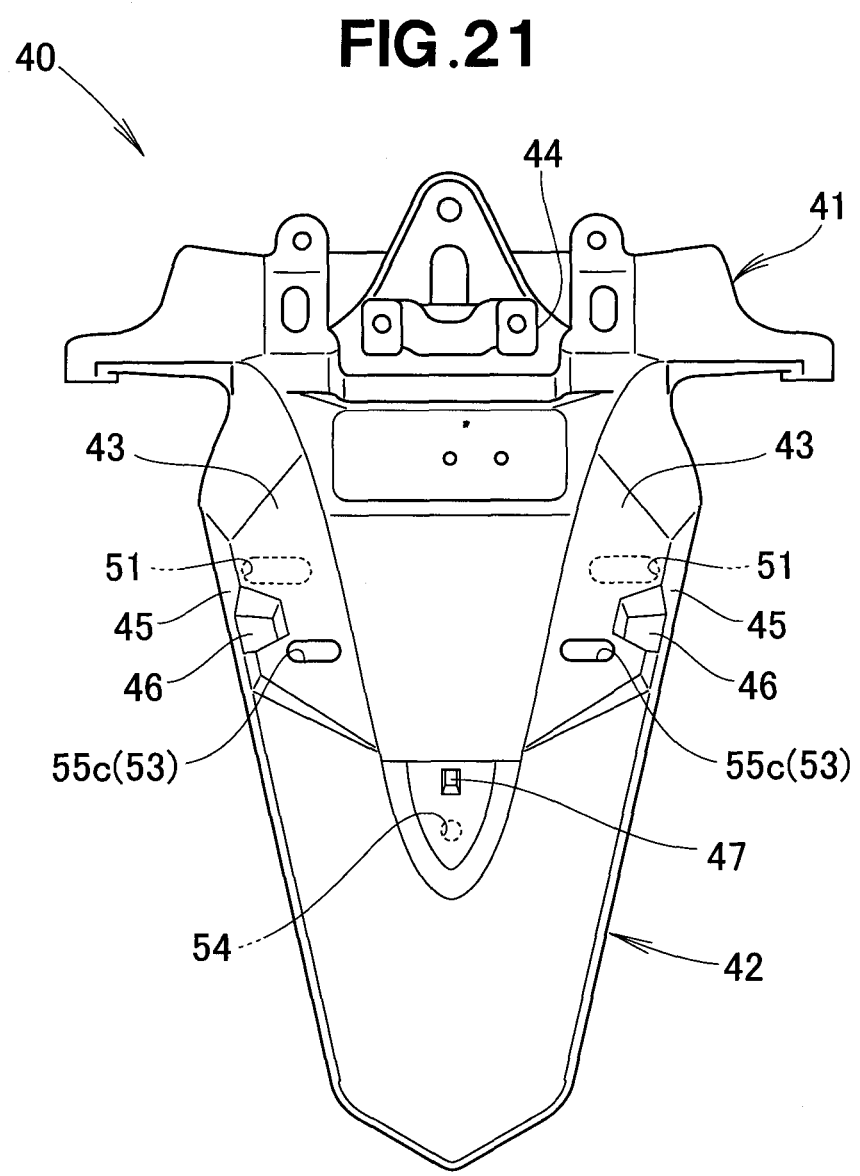
FIG. 21 is a rear elevation view of a rear fender according to Embodiment 3.

As shown in FIG. 21, the second mounting portion 53 (FIG. 9) of the rear fender 40 has the mounting hole 55c formed therethrough using a core during injection molding. The rear surface 43 of the rear fender 40 defines openings all of which are the mounting holes 55c. The mounting portions 51, 52 remain solid without being punched therethrough. This achieves an increased rigidity of the rear fender 40. The mounting hole 55c, which has an oblong shape elongated in the widthwise direction, provides a longer range within which to attach the license plate 60c (FIG. 19) to the rear fender. This allows positional adjustment of the license plate 60c (FIG. 19) in the widthwise direction, such that the license plate is attached at the adjusted position. The oblong mounting holes allow the license plate 60c to be attached at different positions arranged in the widthwise direction.

Figure 22:
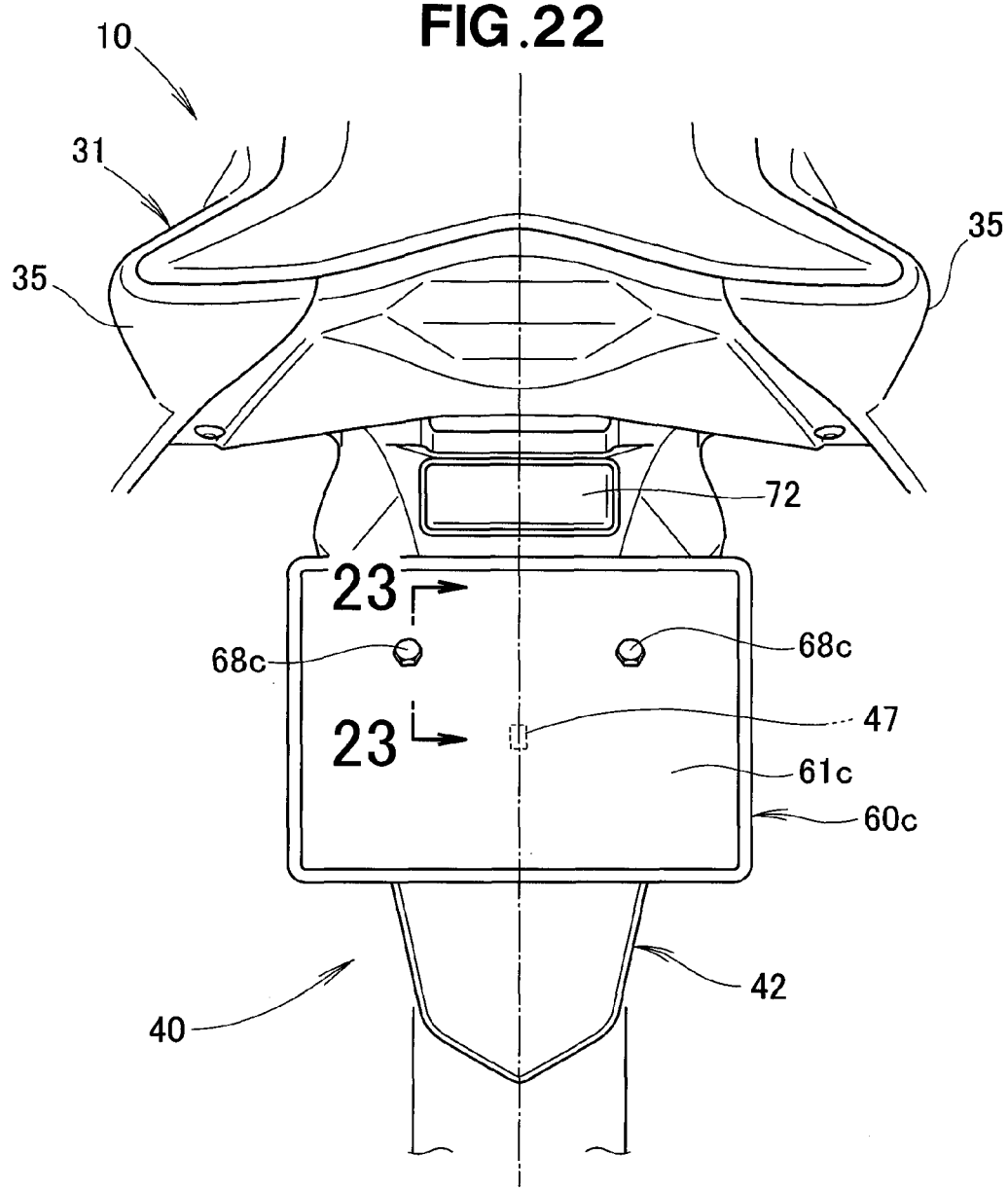
FIG. 22 is a rear elevation view of a motorcycle according to Embodiment 3.
Figure 23:
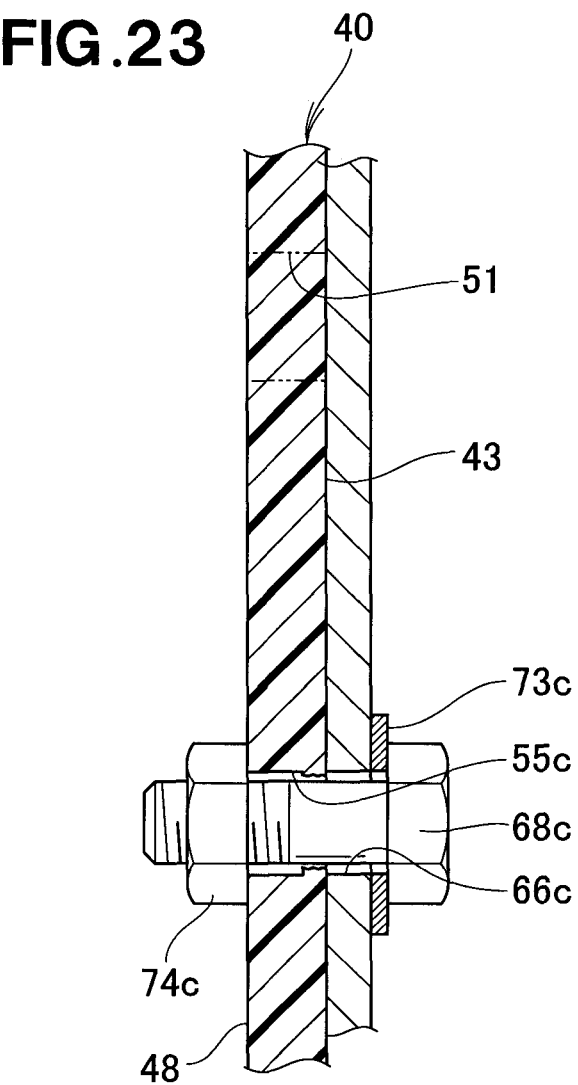
FIG. 23 is a cross-sectional view taken along line 23-23 of FIG. 22.

As shown in FIGS. 22 and 23, the license plate 60c is fastened to the rear fender 40 by a fastener 68c. The fastener 68c, which passes through a washer 73c, the through-hole 66c of the license plate 60c and the mounting hole 55c, is tightened to a nut 74c on the back surface 48 of the rear fender 40.

Figure 24:
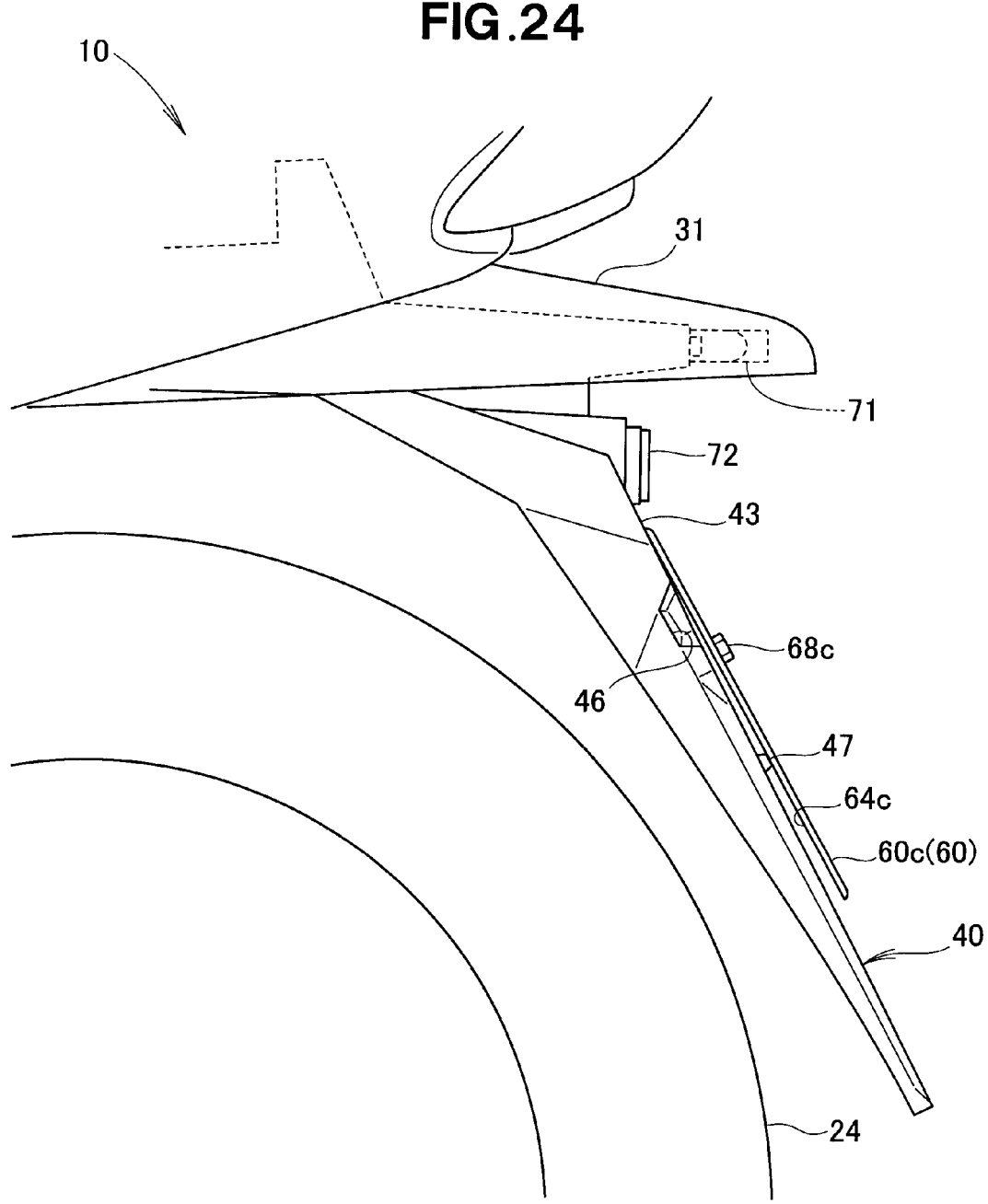
FIG. 24 is a left elevation view of the motorcycle shown in FIG. 22.

As shown in FIG. 24, the license plate 60c is attached to the rear surface 43 of the rear fender 40. The license plate 60c has a lower portion abutting on the protruding portion 47 of the rear fender 40. The abutment flexes the license plate 60c attached to the rear fender 40. This reduces vibration transmitted to the license plate 60c.

In the Embodiment, the plate member 60 is attached directly to the rear fender. Alternatively, the plate member 60 may be attached through a stay to the rear fender 40. When the plate member 60 is attached through the stay to the rear fender, an angle of the plate member 60 relative to the lamp 71 may be appropriately changed.

The three pairs of the respective mounting portions 51, 53 are provided throughout the Embodiments. Alternatively, the mounting portions 51, 53 may be provided in four or five pairs, and may have their shapes, sizes and positions appropriately modified. Although the Embodiments have been described as being applied to the motorcycles, the present invention is applicable to a saddle-ride four-wheeled vehicle (a four-wheeled buggy). The present invention may be also applied to a general-purpose small-sized vehicle.

INDUSTRIAL APPLICABILITY

The present invention is preferably applicable to a motorcycle including a rear fender and a license plate attached to the rear fender.

REFERENCE SIGNS LIST

10 . . . a motorcycle (vehicle)
11 . . . a motorcycle frame
24 . . . a rear wheel
40 . . . a rear fender
43 . . . a rear surface
45 . . . a lateral surface
46 . . . a recessed portion
47 . . . a protruding portion
49 . . . a central portion of the rear fender
51 . . . a first mounting portion
53 . . . a second mounting portion
54 . . . a lower mounting portion
60, 60a, 60b, 60c . . . members (a plate member, a license plate)
65a . . . a rivet
68a, 68b, 68c . . . fasteners
71 . . . a lamp
72 . . . a reflector

The invention claimed is:

1. A motorcycle comprising:
a rear fender disposed on a rear part of a motorcycle frame of the motorcycle for preventing splash of muddy water as the muddy water is forced upwardly by a rear wheel of the motorcycle;
fasteners disposed on rear surfaces of the rear fender and fastened to the rear fender;
a lamp disposed above the rear fender for illuminating the rear surfaces; and
a reflector disposed adjacent the rear surfaces for reflecting light from a rear direction of the motorcycle,
wherein the rear fender includes a plurality of mounting portions,
wherein the fasteners pass through any ones of the mounting portions and are fastened to the rear fender,
wherein the rear surfaces comprise at least one left rear surface and at least one right rear surface when the rear surfaces are viewed in rear elevation, and wherein the rear fender includes a central portion recessed forward relative to the rear surfaces, wherein the rear surfaces include opposite lateral outer ends spaced apart in a widthwise direction of the motorcycle, wherein the rear fender further includes: lateral surfaces protruding from the opposite lateral outer ends of the rear surfaces in a forward direction of the motorcycle; and depressions recessed forward from the rear surfaces to the lateral surfaces, and wherein each of the rear surfaces has a U-shape laterally opened by the depression, and wherein the mounting portions are formed integrally with the depressions.

2. The motorcycle of claim 1, wherein each of the depressions is provided between adjacent ones of the plurality of mounting portions when the depressions are viewed in rear elevation, the adjacent mounting portions being arranged vertically.

3. The motorcycle of claim 2, wherein each of the mounting portions has an oblong shape elongated in the widthwise direction of the motorcycle.

4. The motorcycle of claim 2, wherein the rear fender further includes a rearward protruding portion provided below the mounting portions of the rear fender, and wherein the protruding portion protruding rearward beyond the rear surfaces, the fasteners abutting on the rear surfaces.

5. The motorcycle of claim 2, wherein the mounting portions are provided in pairs, the number of the pairs being at least two.

6. The motorcycle of claim 4, wherein the rear fender further includes a lower mounting portion provided below the protruding portion, and the lower mounting portion selectively has a mounting hole formed therethrough.

* * * * *